United States Patent Office 2,973,374
Patented Feb. 28, 1961

2,973,374

PROCESS FOR THE PRODUCTION OF Δ⁴-19-NOR-PREGNENE-21-OL-3,11,20-TRIONES

Alejandro Zaffaroni and George Rosenkranz, Mexico City, Mexico, assignors to Syntex S.A., Mexico City, Mexico, a corporation of Mexico No Drawing. Filed Apr. 23, 1954, Ser. No. 425,306

Claims priority, application Mexico Apr. 25, 1953

1 Claim. (Cl. 260—397.45)

The present invention relates to novel cyclopentanophenanthrene compounds and to a method for the production thereof.

More particularly the present invention relates to the active cortical hormones Δ⁴-19-nor-pregnen-21-ol-3,11,20-trione and Δ⁴-19-nor-pregnene-17α,21-diol-3,11,20-trione and to the production thereof from Δ⁴-19-nor-pregnene-11β,21-diol-3,20-dione and Δ⁴-19-nor-pregnene-11β,17α,21-triol-3,20-dione respectively by selective oxidation of the 11β-hydroxy group thereof.

In accordance with the present invention it has been discovered that the 11β-hydroxy group of the compounds just referred to may be selectively oxidized with chromic acid if approximately stoichiometric amounts corresponding to approximately one equivalent of active oxygen are utilized.

It has been further discovered in accordance with the present invention that the selective oxidation is best performed in glacial acetic acid at a reacting ingredient temperature below room temperature (20° C.), and preferably at approximately the freezing point of glacial acetic acid solutions of the steroid and chromic acid, for a short period of time, i.e. of the order of five minutes.

The process of the present invention may be exemplified by the following equation:

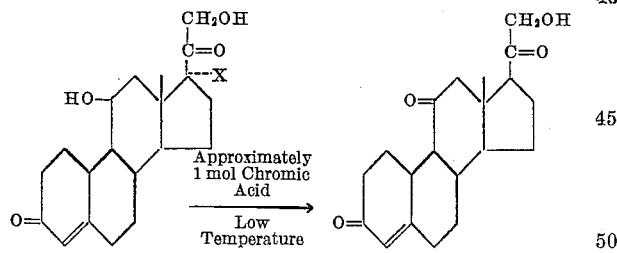

In the above equation X represents hydrogen or a hydroxy group.

In proceeding generally in accordance with the present invention, the steroid starting compound is dissolved in purified glacial acetic acid and cooled to below room temperature, preferably to approximately the freezing point of the glacial acetic acid solution or about 14° C. Chromium trioxide in an amount to give approximately 1 molar equivalent of active oxygen is separately dissolved in purified glacial acetic and similarly cooled to thereby form chromic acid in situ. The second solution is then added to the first solution and the mixture kept at room temperature for a short period of time, i.e. 2 to 10 minutes preferably of the order of about 5 minutes. The oxidation reaction is then terminated and the products suitably purified.

The free compounds Δ⁴-19-nor-pregnen-21-ol-3,11,20-trione and Δ⁴-19-nor-pregnene-17α,21-diol-3,11,20-trione thus produced may then be conventionally esterfied with organic acid anhydrides in the presence of pyridine as for example lower fatty acid anhydrides such as acetic acid anhydride or propionic acid anhydride or aromatic acid anhydride such as benzoic or any other organic acid anhydrides conventionally used to esterify steroid alcohols.

The following specific examples serve to illustrate but are not intended to limit the present invention:

Example I

A solution of 400 mg. of Δ⁴-19-nor-pregnene-11β,17α,21-triol-3,20-dione prepared in accordance with the application of Zaffaroni, Serial No. 425,300, filed as of even date herewith now abandoned, in 12 cc. of purified glacial acetic acid was cooled to 14° C. and then treated with a solution of 83 mg. of chromium trioxide (1.1 molar equivalents of active oxygen) in 30 cc. of purified glacial acetic, which was added in one portion previous cooling to 14° C. The mixture was kept standing at room temperature for 5 minutes and then poured into 200 cc. of a 5% sodium bisulphite solution, extracted with chloroform and the chloroform extract was evaporated to dryness. The residue was purified by chromatography in a column with silica gel. There was obtained 323 mg. of Δ⁴-19-nor-pregnene-17α,21-diol-3,11,20-trione having a melting point of 230–232° C.

Acetylation with acetic anhydride in pyridine afforded the 21-acetate of Δ⁴-19-nor-pregnene-17α,21-diol-3,11,20-trione.

Example II 400 mg. of Δ⁴-19-nor-pregnene-11β,21-diol-3,20-dione prepared in accordance with the application of Zaffaroni, Serial No. 425,300, filed as of even date herewith, now abandoned, was oxidized with chromium trioxide (1.1 molar equivalents of active oxygen) exactly by the same method described in Example I, thus giving 340 mg. of Δ⁴-19-nor-pregnen-21-ol-3,11,20-trione.

Acetylation with acetic anhydride in pyridine yielded the 21-acetate of Δ⁴-19-nor-pregnen-21-ol-3,11,20-trione.

We claim:

A process for the production of compounds of the following formula:

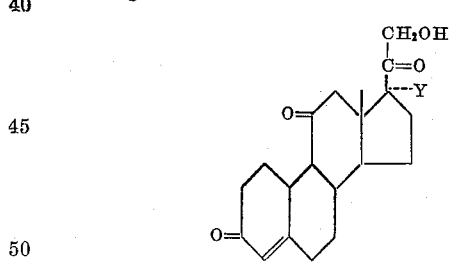

wherein Y is selected from the group consisting of hydrogen and hydroxy which comprises selectively oxidizing a compound of the following formula:

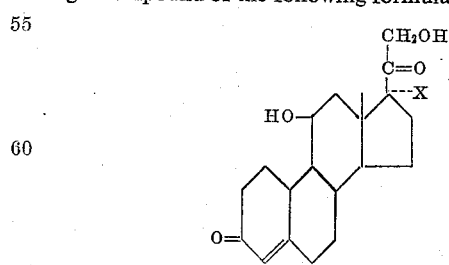

wherein X is selected from the group consisting of hydrogen and hydroxy with chromic acid in approximately the stoichiometric amount corresponding to one equivalent of active oxygen in the presence of acetic acid as a solvent, at a temperature of approximately the freezing point of the acetic acid and for a short reaction time.

(References on following page)

References Cited in the file of this patent

UNITED STATES PATENTS

| | | |
|---|---|---|
| 2,519,507 | Sarett | Aug. 22, 1950 |
| 2,671,095 | Levin | Mar. 2, 1954 |
| 2,678,933 | Meister | May 18, 1954 |

OTHER REFERENCES

Reischstein: Helv. Chim. Acta. 20 953–969, 978–991 (1937).

Fieser et al.: Natural Products Related to Phenanthrene, 3rd edition, page 407 (1949).